(12) United States Patent
Madan et al.

(10) Patent No.: US 11,907,077 B2
(45) Date of Patent: Feb. 20, 2024

(54) SEQUENTIAL FILE RESTORE PERFORMANCE USING DYNAMIC PREFETCH BASED ON FILE LOCALITY

(71) Applicant: Dell Products L.P., Round Rock, TX (US)

(72) Inventors: Nitin Madan, Cupertino, CA (US); Kedar Godbole, Pune (IN); Srikant Viswanathan, Pune (IN)

(73) Assignee: Dell Products, L.P., Round Rock, TX (US)

( * ) Notice: Subject to any disclaimer, the term of this patent is extended or adjusted under 35 U.S.C. 154(b) by 145 days.

(21) Appl. No.: 17/514,172

(22) Filed: Oct. 29, 2021

(65) Prior Publication Data

US 2023/0133530 A1 May 4, 2023

(51) Int. Cl.
*G06F 11/00* (2006.01)
*G06F 11/14* (2006.01)

(52) U.S. Cl.
CPC ...... *G06F 11/1453* (2013.01); *G06F 2201/80* (2013.01)

(58) Field of Classification Search
CPC .................. G06F 11/1453; G06F 2201/80
See application file for complete search history.

(56) References Cited

U.S. PATENT DOCUMENTS

| 7,711,797 B1 * | 5/2010 | Huang | H04L 67/5681 |
| | | | 710/36 |
| 11,522,773 B1 * | 12/2022 | Tedesco | H04L 47/2441 |
| 2017/0161329 A1 * | 6/2017 | Chambliss | G06F 16/1748 |
| 2020/0302304 A1 * | 9/2020 | Hu | G06T 1/60 |

OTHER PUBLICATIONS

Gu et al., Toward Efficient and Simplified Distributed Data Intensive Computing, IEEE Transactions on Parallel and Distributed Systems, vol. 22, No. 6, Jun. 2011, retrieved on May 17, 2023, retrieved from the Internet <URL: https://ieeexplore.ieee.org/stamp/stamp.jsp?arnumber=5719610> (Year: 2011).*

* cited by examiner

*Primary Examiner* — Tyler J Torgrimson
(74) *Attorney, Agent, or Firm* — Staniford Tomita LLP

(57) ABSTRACT

Embodiments of a system and method to track the locality of a file being restored at the time of prefetching; and a mechanism to dynamically adjust the prefetching parallelism, per read batch, optimally based on the locality and other heuristics, such as system load. A process tracks locality of data elements in a batched data stream, as corresponds to a number of different container IDs accessed by the data elements. The prefetch nominally works serially on the data elements, however, if the locality exceeds a threshold separating acceptable versus non-acceptable distribution of data accesses, each batch is divided into a number of smaller sub-batches that are then pre-fetched in parallel with one another.

17 Claims, 8 Drawing Sheets

SEQUENTIAL FILE RESTORE PERFORMANCE USING DYNAMIC PREFETCH BASED ON FILE LOCALITY

TECHNICAL FIELD

Embodiments relate generally to deduplication storage systems, and more particularly to systems and methods for improving restoration of files using data locality.

BACKGROUND OF THE INVENTION

Data is typically backed up by copying the data from a data source to a data target or storage device or network. Data deduplication is a form of single-instance storage that eliminates redundant copies of data to reduce storage overhead. Data compression methods are used to store only one unique instance of data by replacing redundant data blocks with pointers to the unique data copy. As new data is written to a system, duplicate chunks are replaced with these pointer references to previously stored data. Though storage requirements are greatly reduced, processing overhead is increased through the processes of deduplication.

Data restores involve moving stored data from the storage target back to the data source or active tier after a data loss event on the data source. In a typical filesystem, the restore operations are aided by a read-ahead (prefetch) mechanism. The simplest form of prefetching is a read hint issued at a certain horizon from the read offset. A single read request typically issues a single prefetch request at an offset calculated from the read offset and prefetch horizon. As an example, if the read comes in at an offset 0 MB, the prefetch request is issued at the 0 MB+prefetch horizon MB. Typically, the prefetch horizon is a few MB. It is higher in the scenarios where the underlying storage layer is slower. This mechanism generally works well since the application read requests mostly find all their data already present in the read-ahead cache, and therefore need not block for I/O operations, thus considerably improving read performance.

Since the read operations are copying data out from memory while the prefetches are doing the actual work of reading from the storage layer, the reads periodically catch up with the prefetches. Such read requests block I/Os until the data becomes available, but during this time the prefetches that have been issued out already by the previous reads get time to perform their I/O operations and load data into memory. This ensures that the subsequent read requests do not block I/Os until a read catches up again with the prefetch. This cycle continues throughout the restore of a file, and since most of the reads are getting served out of memory, throughput improvement is significant. This however requires that the data being fetched has a high degree of locality. Current prefetch systems process fingerprint and index data in a serial fashion. If a fingerprint within a batch is not found in memory, I/O operations to storage are triggered. Efficient pre-fetch operations thus require the prefetched data have sufficient locality to prevent excessive I/O amplification.

What is needed, therefore, is a prefetch process that overcomes lack or poor locality among sequentially read data to improve file restore performance.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions. EMC, Data Domain, Data Domain Restorer, and SISL are trademarks of Dell EMC Corporation.

BRIEF DESCRIPTION OF THE DRAWINGS

In the following drawings, like reference numerals designate like structural elements. Although the figures depict various examples, the one or more embodiments and implementations described herein are not limited to the examples depicted in the figures.

DETAILED DESCRIPTION

Figure 1:
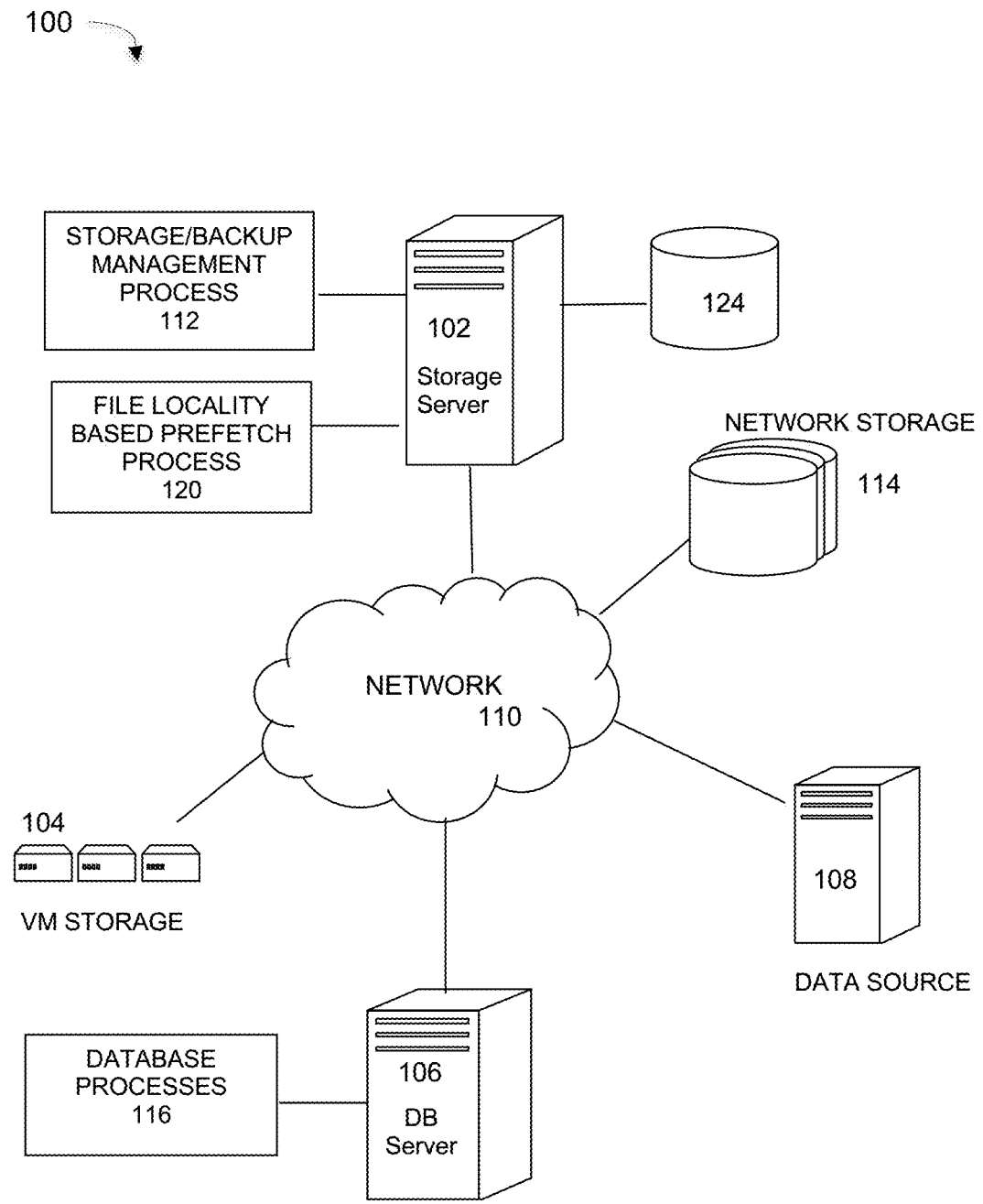
FIG. 1 is a diagram of a computing network implementing a file locality-based prefetch process in a deduplication storage system, under some embodiments.

A detailed description of one or more embodiments is provided below along with accompanying figures that illustrate the principles of the described embodiments. While aspects of the invention are described in conjunction with such embodiment(s), it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random-access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively, or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general-purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the invention.

Some embodiments of the invention involve software and systems deployed in a distributed system, such as a cloud based network system or very large-scale wide area network (WAN), metropolitan area network (MAN), however, those skilled in the art will appreciate that embodiments are not limited thereto, and may include smaller-scale networks, such as LANs (local area networks). Thus, aspects of the one or more embodiments described herein may be implemented on one or more computers executing software instructions, and the computers may be networked in a client-server arrangement or similar distributed computer network.

Embodiments are described for a process for improving file restores in deduplication backup systems. FIG. 1 illustrates a computer network system that implements one or more embodiments of a data processing and storage network system implementing an improved file restoration process, under some embodiments. In system 100, a storage server 102 executes a data storage or backup management process 112 that coordinates or manages the backup of data from one or more data sources 108 to storage devices, such as network storage 114, client storage, and/or virtual storage devices 104. With regard to virtual storage 104, any number of virtual machines (VMs) or groups of VMs (e.g., organized into virtual centers) may be provided to serve as backup targets. The VMs or other network storage devices serve as target storage devices for data backed up from one or more data sources, such as storage server 102 or data source 108, in the network environment. The data sourced by the data source may be any appropriate data, such as database data that is part of a database management system, and the data may reside on one or more hard drives for the database(s) in a variety of formats. Thus, a data source may be a database server 106 executing one or more database processes 116, or it may be any other sources data for use by the resources of network 100.

The network server computers are coupled directly or indirectly to the data storage 114, target VMs 104, and the data sources and other resources through network 110, which is typically a cloud network (but may also be a LAN, WAN or other appropriate network). Network 110 provides connectivity to the various systems, components, and resources of system 100, and may be implemented using protocols such as Transmission Control Protocol (TCP) and/or Internet Protocol (IP), well known in the relevant arts. In a cloud computing environment, network 110 represents a network in which applications, servers and data are maintained and provided through a centralized cloud computing platform.

The data generated or sourced by system 100 and transmitted over network 110 may be stored in any number of persistent storage locations and devices. In a backup case, the backup process 112 causes or facilitates the backup of this data to other storage devices of the network, such as network storage 114, which may at least be partially implemented through storage device arrays, such as RAID components. In an embodiment network 100 may be implemented to provide support for various storage architectures such as storage area network (SAN), Network-attached Storage (NAS), or Direct-attached Storage (DAS) that make use of large-scale network accessible storage devices 114, such as large capacity disk (optical or magnetic) arrays. In an embodiment, system 100 may represent a Data Domain Restorer (DDR)-based deduplication storage system, and storage server 102 may be implemented as a DDR Deduplication Storage server provided by EMC Corporation. However, other similar backup and storage systems are also possible.

In general, Data Domain is a purpose-built backup appliance providing streaming deduplication that is able to ingest data at full network speeds, from multiple backup sources while providing storage efficiency. Present Data Domain systems are able to use tiered data storage technologies, such as very large multi-terabyte SATA drive trays, or SSD-enabled fast ingest trays.

The Data Domain File System (DDFS) is an inline data deduplication file system. As data gets written to the file system, DDFS breaks it into variable sized segments and a group of segments are packed in a compression region. A number of compression regions are grouped together and written as a container to disk. DDFS calculates fingerprint signatures for each segment using SHA1 algorithm. DDFS has an on-disk fingerprint index table, which maps the fingerprint to the container-ID, that has the corresponding segment data. The container has a metadata section followed by several data sections. The data sections store the compression regions; and the container metadata section stores the meta information of the container, i.e., it stores the total number of compression regions, the total number of segments, the fingerprint of each segment, and so on.

In a deduplicated file-system that forms segments from data, these segments are uniquely identified by their key/label called as fingerprint. Given a file offset and length, the corresponding data segment fingerprints need to be looked up. To provide faster offset to fingerprint lookup the mapping is stored in a Merkle tree format where the leaf nodes represent data segments and their fingerprints are stored in the parent nodes which are metadata segments. In a Merkle tree, every non-leaf node is labeled with the hash of the labels of its children nodes to allow efficient and secure verification of the contents of large data structures.

A file in DDFS is represented by a Merkle tree, with user data as variable sized segments at the bottom level of the tree, referred to as L0 segments. The SHA1 fingerprints of those segments are grouped together at the next higher level of the tree to form new segments, referred to as L1 segments. SHA1 fingerprints of L1 segments are grouped together as L2 segments, and this continues up to L6 which represents the entire file. The top segment of the tree is always an L6 segment, even though it may refer to any lower numbered segments. Segments above L0 are referred to as Lp chunks. The L6 segment of every file is stored in a namespace which is represented as a B+ Tree. The L0 and Lp segments are written to separate containers, known as L0 and Lp containers.

In a Merkle tree, the data chunks directly written to disk are referred to as $L_0$, meaning the lowest level of the tree. Consecutive $L_0$ chunks are referenced with an array of fingerprints by an $L_1$ chunk, which itself is identified by a fingerprint. An array of $L_1$ fingerprints is referenced by an $L_2$ chunk, continuing to the root of the tree; the root is always labeled $L_6$ for convenience, even if the file is small enough not to need intermediate nodes such as the example on the right side of the figure. The $L_1$-$L_6$ chunks are referred to as $L_p$ chunks, where p is a parameter that ranges from 1 to 6 and indicates metadata representing the file. Deduplication takes place because a chunk can be referenced multiple times. The file system is a forest of Merkle trees, but these trees are not disjoint, particularly at the lowest level. In general, $L_p$ chunks are themselves stored on disk in containers, which include a relatively small (hundreds of KB) metadata section with a list of fingerprints for the chunks within the container. Thus, they may be read more quickly than the full container. A Data Domain or similar system can efficiently copy an existing file using the same underlying Merkle tree. It creates the new file with a new name, and therefore a new $L_6$ root of the tree, but that tree then references the identical $L_P$ chunks. As this operation involves only the root of the tree, it is trivially fast and does not increase physical space in use beyond the one chunk containing the $L_6$ data.

Figure 2:
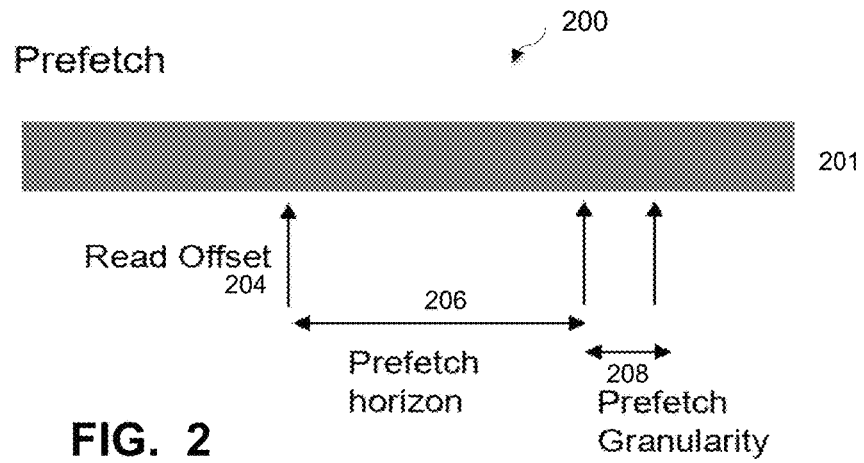
FIG. 2 illustrates a prefetch process that is adopted for use with a file locality-based prefetch process, under some embodiments.

As mentioned in the background section above, in a typical filesystem (e.g., DDFS), data restores are aided by a read-ahead (prefetch) mechanism, such as a read hint issued at a certain horizon from the read offset. A single read request typically issues a single prefetch request at an offset calculated from the read offset and a set prefetch horizon. FIG. 2 illustrates a prefetch process that is adopted for use with a locality-based prefetch process to improve file restores, under some embodiments. FIG. 2 shows certain prefetch parameters defined for a horizontal axis 201 denoting memory capacity in megabytes (MB), or any similar unit of storage). As shown in FIG. 2, for a prefetch request issues at a point after an application's read request as defined by a read offset 204 and a prefetch horizon 206. As shown in the example scenario of diagram 200, a read comes in at a read offset 0 MB, and a prefetch request is issued at the 0 MB plus the prefetch horizon value in MB. Typically, the prefetch horizon 206 is on the order of 30 MB or so (e.g., between 15 to 50 MB), and is higher when the underlying storage layer is slower, although any value is possible.

The prefetch granularity 208 shown in the example of FIG. 2 is on the order of 1 MB for a prefetch horizon of 30 MB. The prefetch granularity is the size of the prefetch I/O operation. In large sequential reads, it is typically 1 MB for one example, though other sizes are also possible. Likewise, the read offset 204 is typically 0, but can be any other practical value.

The prefetching operation 200 can be for any file or data restore process that comprises an application issuing a file open request followed by a plurality of read and write requests and a file close. In this context, the prefetch 200 moves data from a prefetched file into a read-ahead cache to be sent to a read request consumer of the file system. Any similar operation that uses a prefetch mechanism as a hint to indicate upcoming reads may also be used.

Without the benefit of a prefetch process 200, each read request becomes a blocking read (i.e., block pending I/O operations), and is limited by the backend storage performance, thus at least some degree of data pre-fetching is usually desired to reduce I/O blocking and improve file restore performance.

As read operations copy data out from memory, the prefetches 200 do the actual work of reading data from the storage layer. As the reads periodically catch up with the prefetches, these reads block I/Os until the data becomes available. During this time, however, the prefetches that have been issued out already by the previous reads get time to perform their I/Os and load data into memory. This ensures that the subsequent read requests do not block I/Os until a read again catches up with the prefetch. This cycle continues throughout the restoration of a file, and since most of the reads are getting served out of memory, throughput improvement is significant, at least in the case of data locality for the prefetch. As mentioned previously, an issue occurs, however, when data locality is compromised or not sufficient. In this case, the sequential processing of fingerprint data can cause excessive I/O operations, otherwise referred to as "I/O amplification." Embodiments of system 100 include a prefetch process 120 that improves the efficiency of pre-fetched fingerprint data to reduce any such I/O amplification and improve file restoration performance.

As mentioned above, DDFS is an example of a streaming deduplication system that ingests data at full network speeds. The Stream-Informed Segment Layout (SISL) scheme of Data Domain is one example of a mechanism that is used to filter both new unique segments and redundant duplicate segments to provide fast inline deduplication, and others are also possible.

Figure 3:
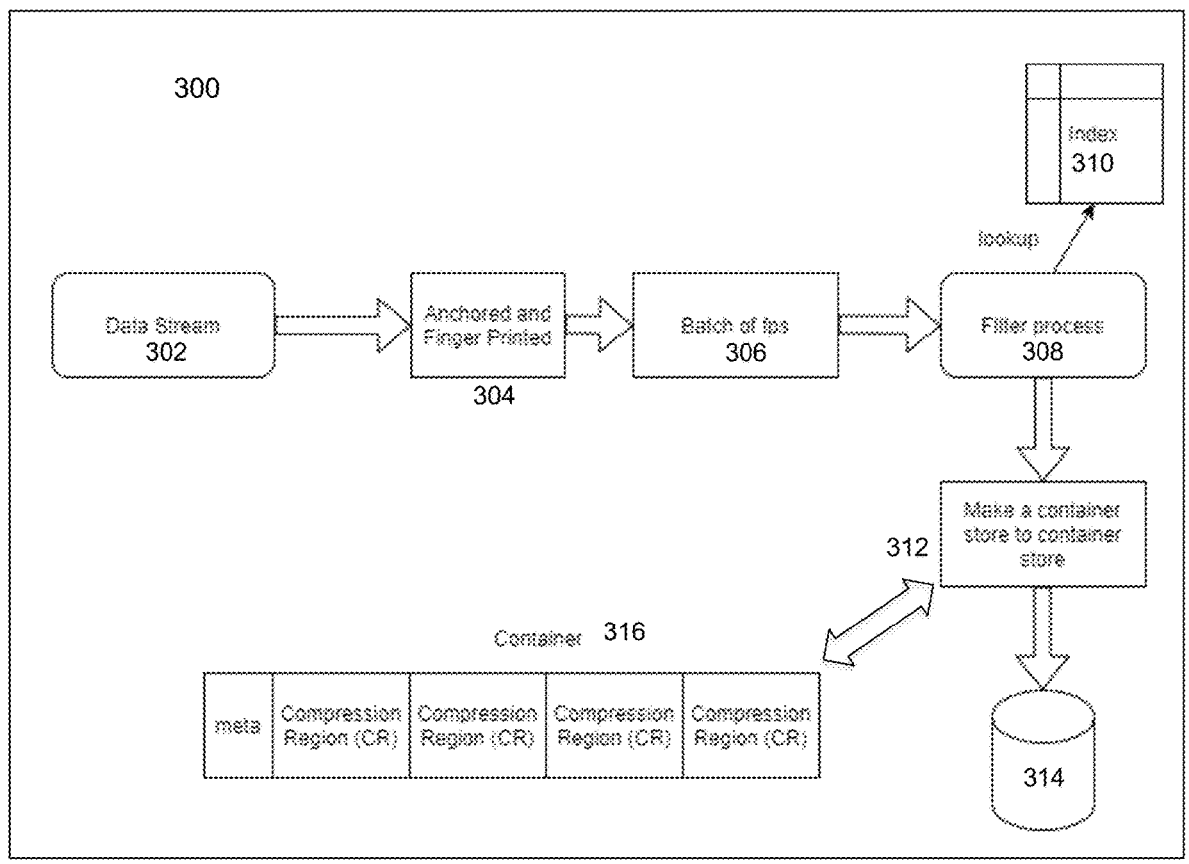
FIG. 3 illustrates processing of a write data stream for a deduplication process, under some embodiments.

FIG. 3 illustrates processing of a processing a write data stream for a deduplication process, under some embodiments. Diagram 300 shows a data stream 302 to be processed by a filter process 308. During ingest, the incoming data stream 302 is broken up into small chunks called segments and each segment is fingerprinted 304 with a fingerprint that identifies the segment. The fingerprints are gathered into batches 306 and the incoming fingerprints for a batch of data are checked by filter process 308 against a fingerprint index 310 to determine if a fingerprint for a data segment already exists or not. This check by the filter process constitutes the deduplication operation for the backup system 100. In this way, the filter process 308 eliminates pre-existing data segments and passes on only the new segments to be written to storage 314.

As shown in FIG. 3, the new segments passed by filter process 308 are stored in data elements called 'containers' and made by container process 312. Element 316 illustrates an example container. Once the filtered segments are ready, they are packed and compressed into units called compression regions (CRs). Multiple compression regions are then packed into data elements a container 316. Each container has metadata that identifies all the fingerprints stored inside the CRs that comprise that container. As the data stream 302 is packed in containers 316, when the read requests come in, caches for the metadata will help by reducing the number of index 310 lookups.

In an embodiment, system 100 maintains three separate data elements referred to as an index, a fingerprint cache, and a region cache.

The index is an on-disk data structure that maps a fingerprint to a container ID. Given a fingerprint, the process can search the index to find the container ID in which the fingerprint is located. The index is built from the container metadata of all the containers present in the system. However, looking up the index every time is expensive, so this information is cached in memory as well.

The fingerprint cache is an in-memory cache having the same information as the index, i.e., it contains the mapping of a fingerprint to container ID. The fingerprint cache is populated from the container metadata of the container ID returned by Index. Since a container has about 1000 fingerprints on average (in present configurations) and data with good locality can use most of these fingerprints, the system saves a large number of disk I/Os to index. This is generally what SISL achieves for DDFS.

The region cache is an in-memory data cache, which contains the uncompressed data for a region (which is a collection of segments with a fingerprint to identify each segment in the region). This data structure can be searched in memory by looking it up with a fingerprint to get the segment data. A prefetch request reads compression regions (a compressed region) from disk in advance, decompresses it and populates the region cache, so that a read request can find the required data in the region cache instead of going to disk to find the required data.

Figure 4:
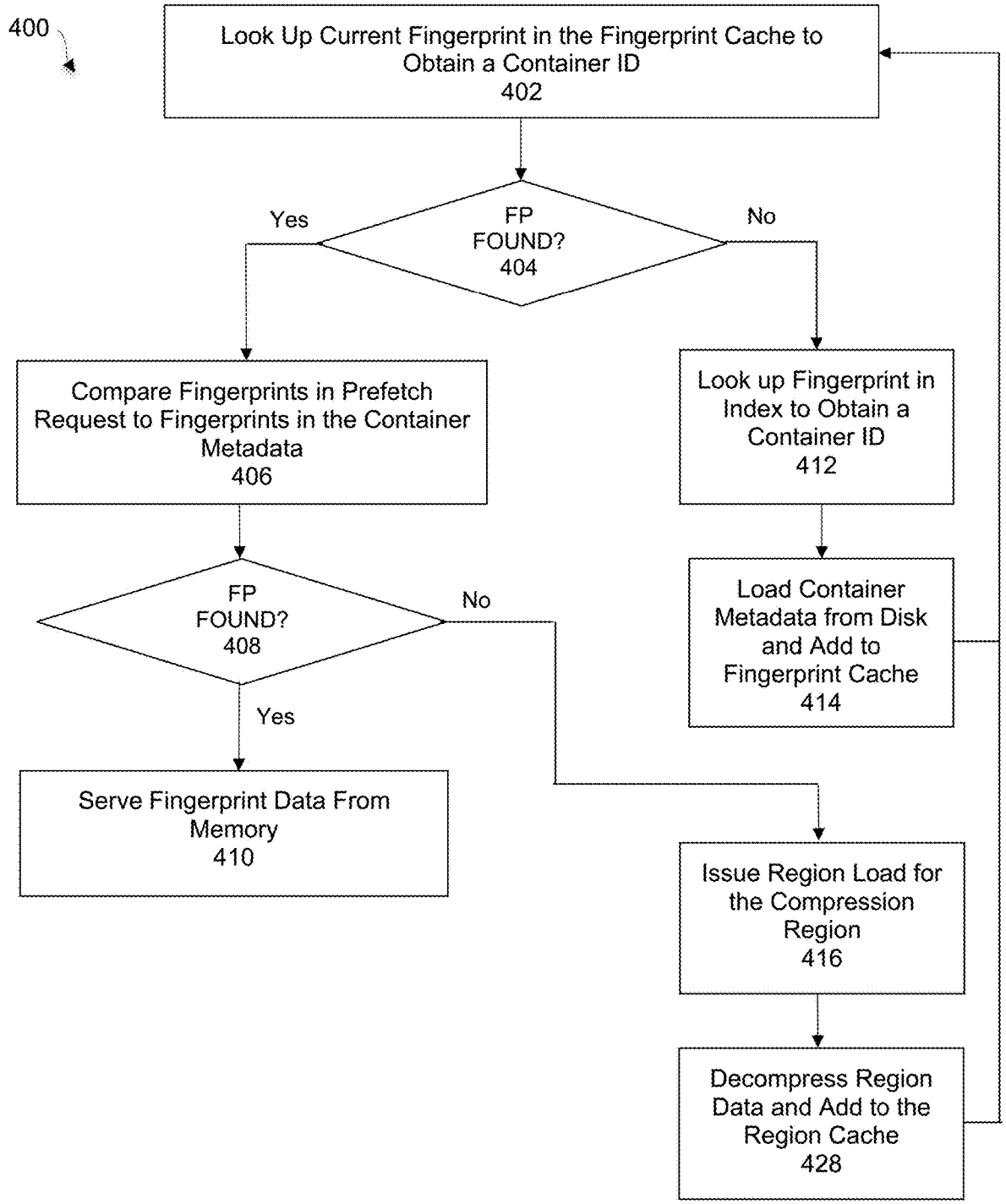
FIG. 4 is a flowchart that illustrates the workflow of a prefetch operation, under some embodiments.

As mentioned above, the read requests heavily depend on the prefetch requests for good performance. When processing a prefetch request, the offset range gets translated to a list of fingerprints. FIG. 4 is a flowchart that illustrates the workflow of a prefetch operation, under some embodiments. The prefetch workflow 400 starts from the first FP in the request and looks up the current fingerprint in the fingerprint cache to obtain a container identifier (ID), 402. If the fingerprint is found, as determined in decision block 404, the process then compares the fingerprints in the prefetch request with the fingerprints identified by the container metadata to identify the compression regions that are unique and that need to be loaded, 406. During normal SISL operations, a lot of fingerprints are typically expected to match the loaded container metadata due to SISL properties. If the compared fingerprint is found, as determined in decision block 408, the process then serves the fingerprint data from memory, 410.

If, in step 404, the fingerprint is not found, the process looks up the fingerprint in the index to obtain a container ID, 412. It then loads the corresponding container metadata from disk and adds it to the fingerprint cache, 414. The process then iterates from step 402 to match the next fingerprints in the same or next container.

If the compared fingerprint do not match after the compare process of step 406, the process issues a region load for the identified compression region, 416. The process decompresses the region data and adds it to the region cache, 428. The process then iterates from step 402 until there are no longer any fingerprints to be processed from the prefetch request. For purposes of description, a 'load' refers to issuing a disk I/O to read the compression region from a container on disk.

Figure 5:
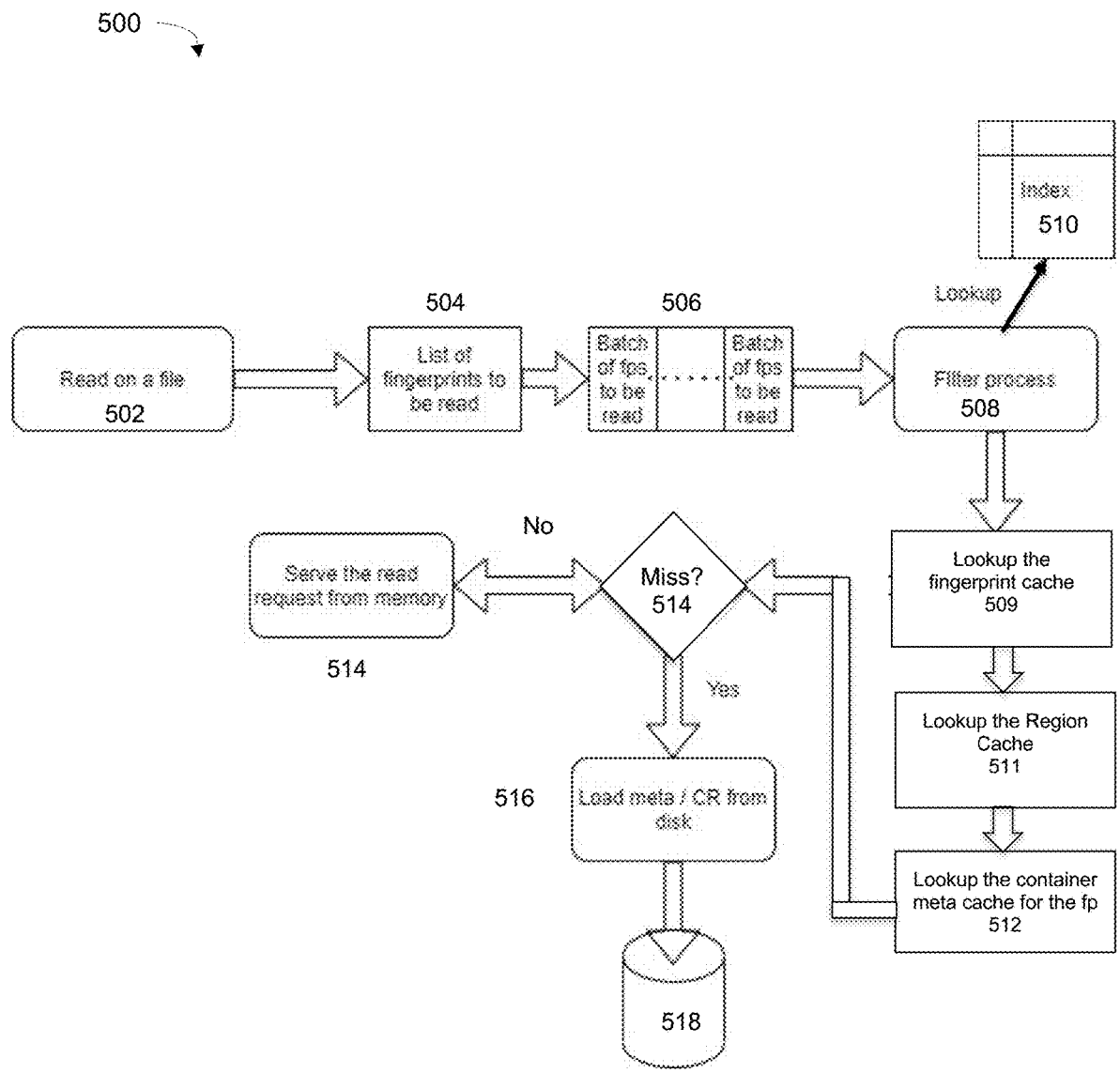
FIG. 5 is a diagram illustrating a method of processing prefetch requests with both fingerprint matches and misses, under some embodiments.

FIG. 5 is a diagram illustrating a process of processing prefetch requests with both FP matches and misses, under some embodiments. As shown in diagram 500, a read operation on a file 502 generates a list of fingerprints to be read, 504. These are then batched 506 and input to the filter process 508. The filter process performs a lookup on index 510 to get the container ID. When this is returned, the filter process 508 looks up the fingerprint cache 509 and the region cache 511 and then looks up the container metadata cache for the fingerprint, 512 to determine whether there is a fingerprint hit or miss, 514. If there is a hit (no miss), the data segment is not unique and is already in memory, so the read request is served from the memory, 514. If there is a miss, the data segment is unique and the metadata for the CR is loaded 516 from disk 518. This access to/from disk 518 results in a possibly long disk access that results in or amplifies I/O operations in process 500.

As can be seen in FIG. 5, the prefetch batches and the fingerprints within the batch are read in a serial fashion. This works well enough for good locality sequential restores, but if the locality is bad, the I/O amplification causes the batches to be served slowly, thus resulting in slow file restores. Locality is thus a key characteristic with respect to efficient or inefficient file restores using a prefetch process.

As used herein, the term 'locality' of a file refers to the number of different containers that need to be accessed to fetch data for a particular offset range. Locality is an indicator of the I/O amplification that would occur if the system attempted to read the data.

In present systems, and as shown in FIG. 4, all the index lookups that need to be made are executed one after the other, in a serial fashion. The assumption is that an index lookup will fetch container metadata against which several fingerprints would match, due to SISL properties. However, as successive generations of a backups are ingested, later generations deduplicate against several previous generations already backed up on the DDR, and therefore suffer from some degree of bad locality. This implies that one index lookup matches very few fingerprints from a current prefetch batch, thus resulting in the necessity of issuing many index lookups to process a prefetch batch. The number of index lookups required for processing a bad locality batch may be on the order of ten to hundreds of time those of a good locality prefetch batch. Furthermore, bad locality also implies that there is significant increase in the number of different containers required to fetch data for any particular offset range.

Thus, when a file being restored has bad locality, the prefetches suffer from higher latency because of the I/O amplification and sequential processing of fingerprints in a prefetch batch. This leads to significant increase in the number of reads getting blocked, thereby causing a degradation in performance. While file locality is a concept that is not unique to deduplication file systems, it's effect exacerbates its impact in the context of deduplication backup systems.

As stated above, the case of bad locality results in the significant increase in the number of index lookup so that executing them serially consumes more time for greater container metadata loads. In an embodiment, the file locality prefetch process 120 introduces certain processing elements that help overcome the case of bad locality caused by serially processing index lookups by introducing certain parallel processing. In an embodiment, process 120 performs two main steps. First it tracks the locality for a stream being restored based on the prefetch batches, and second, in the case of bad locality, it slices (or 'divides' or 'splits') the original batch of segments into smaller batches that are then executed in parallel.

Figure 6:
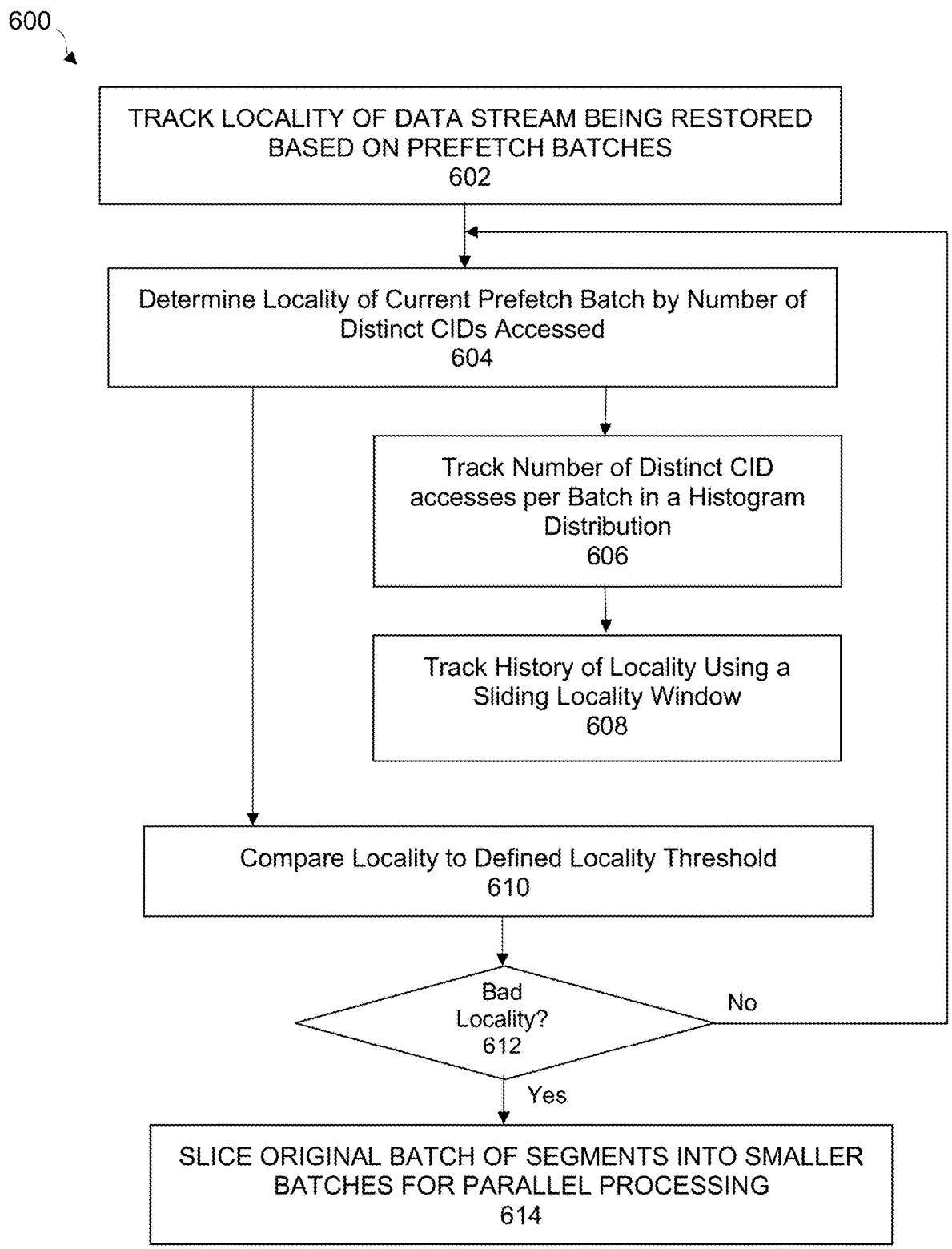
FIG. 6 is a flowchart illustrating an overall method of performing a file locality-based prefetch process, under some embodiments.

FIG. 6 is a flowchart illustrating a method of performing a file locality based prefetch process, under some embodiments. The main steps of process 600 are tracking the locality of incoming data streams being restored based on prefetch batches, 602 and, for batches that exhibit bad locality, slicing an original batch of segments into smaller batches for parallel processing, 610.

With respect to tracking the prefetch locality, locality is determined by finding the number of distinct container IDs (CIDs) accessed in a current prefetch batch of the data stream, 604. This locality measure determined in at least two different ways. The first is to track the number of distinct CID accesses per batch in a histogram that captures the distribution and provides a mean for the distribution, 606. For example, the histogram may show that each prefetch batch is, on the average, accessing 16 different containers. This information is tracked as part of the stream information structure, such as in a SISL or similar system.

A second, alternate way is to track the history of locality for a certain number n last prefetch batches, 608. This approach essentially maintains a sliding locality window and the window average captures the locality of the latest region of the file that was restored. This approach helps in cases where a file may not have uniform locality throughout. The sliding locality window 608 adapts to changes in locality as it moves along the file.

As the data stream for the file being restored is processed, some batches may exhibit good or sufficient locality to be processed as usual through present serial processing operations. To process batches that exhibit bad locality, a minimum locality threshold is defined. The threshold value is determined based on system configuration and performance. For example, if the average number of CIDs accessed by a prefetch batch of a certain size (e.g., 128 segments) is 16, then this can be used as an initial threshold. If it is found that prefetch performance is or is not acceptable for this number of CIDs, the threshold can be adjusted up or down accordingly.

In an embodiment, the locality of a file, data, data segments, fingerprint sets, or any other dataset relative to other like data is quantified by a metric value corresponding to the threshold value measure to facilitate comparison. Locality is generally defined in relation to the number of different containers accessed by the dataset. A dataset that accesses only one container thus has greater (better) locality than one that accesses many containers. The locality metric may be determined based upon the size of a prefetch batch (e.g., 128 segments) and the average number of CIDs accessed by a prefetch batch (e.g., 16) to yield numbers that can be combined to define locality as a distribution of accesses, where a greater number of CIDs accessed implies poorer locality as compared to only one or a few CIDs.

Likewise, the threshold value may be defined as a metric or numerical value along any appropriate scale, such as 1 to 10, 1 to 100, and so on, to match the locality metric. Any directional value may also be assigned. For example, a numerically higher threshold value indicates closer locality among data elements and a numerically lower threshold value indicates a higher degree of distribution of the data elements.

In step 610, the locality of a current prefetch batch is compared to this threshold to determine if the batch should be processed serially or sliced into smaller batches for parallel processing. If, in step 612, it is determined that the locality is sufficiently good (i.e., above the threshold), the current batch is processed normally and the process 600 operates on the next prefetch batch in the sequence. If, however, the current batch exhibits bad locality (i.e., below the threshold), the batch is sliced into smaller batches (sub-batches) for parallel processing, 610.

Figure 7:
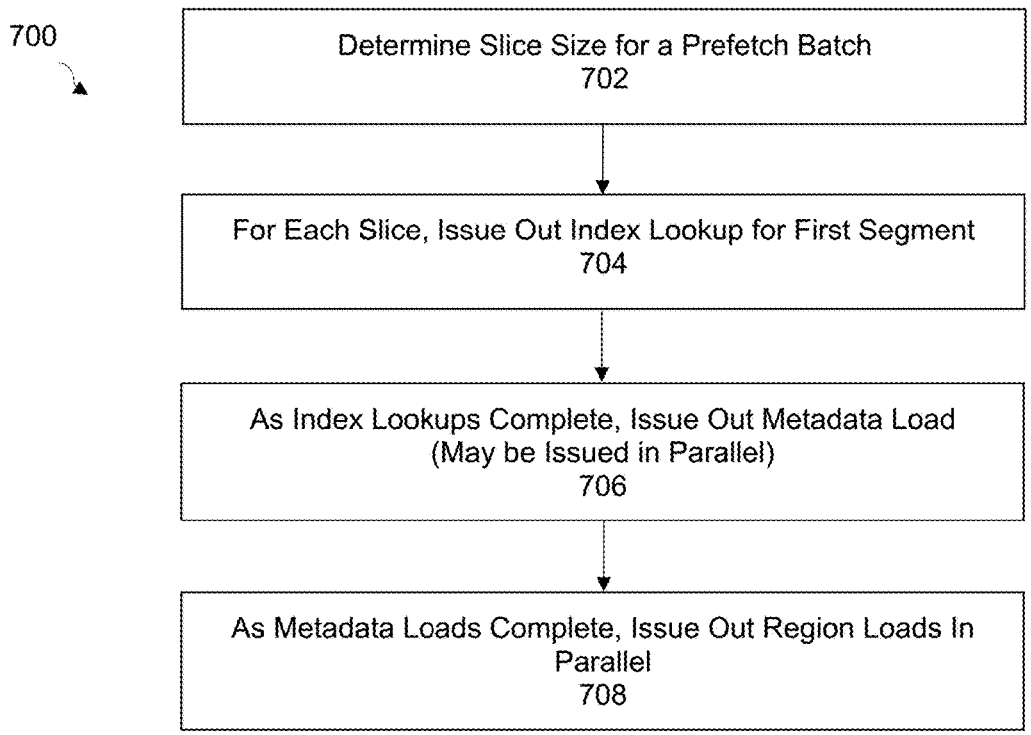
FIG. 7 is a flowchart that illustrates a method of optimally slicing a prefetch batch into smaller batches to improve locality of prefetches, under some embodiments.
Figure 8:
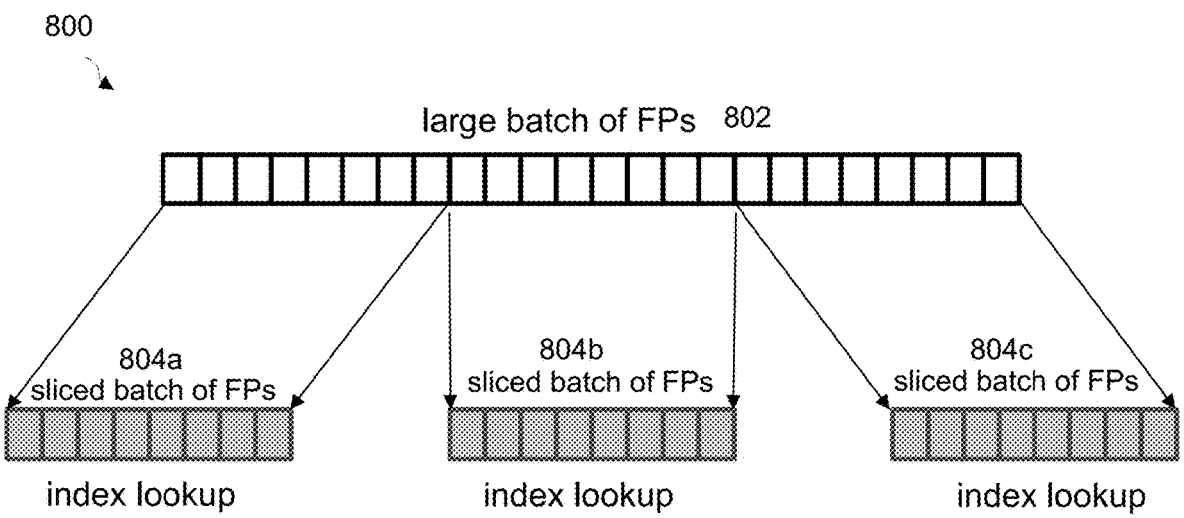
FIG. 8 illustrates slicing a prefetch batch into smaller sub-batches for parallel process, under some embodiments.

FIG. 7 is a flowchart that illustrates a method of optimally slicing a prefetch batch into smaller batches to improve locality of prefetches, under some embodiments. Process 700 begins with step 702, which determines a slice size for a prefetch batch based on the locality determined in step 604 previously. If the locality is not sufficiently good, the batch is considered too large and is sliced into sub-batches, as shown in FIG. 8. In diagram 800, a large batch 802 is sliced into smaller sliced batches of fingerprints 804*a*, 804*b*, and 804*c*. Index lookups are then performed for these sub or sliced batches in parallel with one another.

For example, suppose the prefetch batch has 128 segments, and average number of CIDs accessed by a prefetch batch is 16. Dividing the prefetch batch into 16 slices, yields individual slices each containing 8 segments (128/16). Each slice is expected to access a different container ID. Any other similar slicing of prefetch batches into smaller sub-batches is possible depending on system configuration.

In general, the sub-batches are all of equal size to facilitate the parallel processing of index lookups for each sub-batch. In addition, the slice size is determined by the locality and certain system parameters such as system load, which may comprise number of streams, background jobs, I/O response time, and other similar factors. In an embodiment, the slicing operation is performed with some degree of intelligence to accommodate different conditions, such as system load. For example, in situations where there is little load, the large batch 802 may be sliced into a higher number of larger slices, while if there is heavy load, the large batch 802 may be sliced into a fewer number of smaller slices. In an embodiment, throttling logic is provided to enable this mechanism to increase or decrease the amount of slicing based on the system load to thereby increase or decrease the amount of prefetch batch slicing in case of higher or lower system loads. Such an approach adds a heuristic aspect to the overall process.

In an embodiment, the system load parameters may be considered separately to provide finer grained calculation of slice sizes. For example, a set of load parameters may be defined, such as: number of streams, number of background jobs, and I/O response time. Weights may be assigned to each factor, and an optimum slice size determined based on a combination of these load factors. Other factors or system parameters besides system load may also be used.

With reference back to FIG. 7, once the slice size has been determined (702), the process issues out, for each slice, an index lookup for the first segment in that slice, 704. Through this step, index lookups for the slices are essentially issued out in parallel. As and when the index lookups complete, the system issues out the metadata load, 706. These metadata loads are effectively issued out in parallel. As and when a metadata load completes, the system then issues out the region load, 708. Again, the multiple regions loads (I/O request to read a compression region from a container on disk) are thus effectively issued out in parallel.

Figure 9:
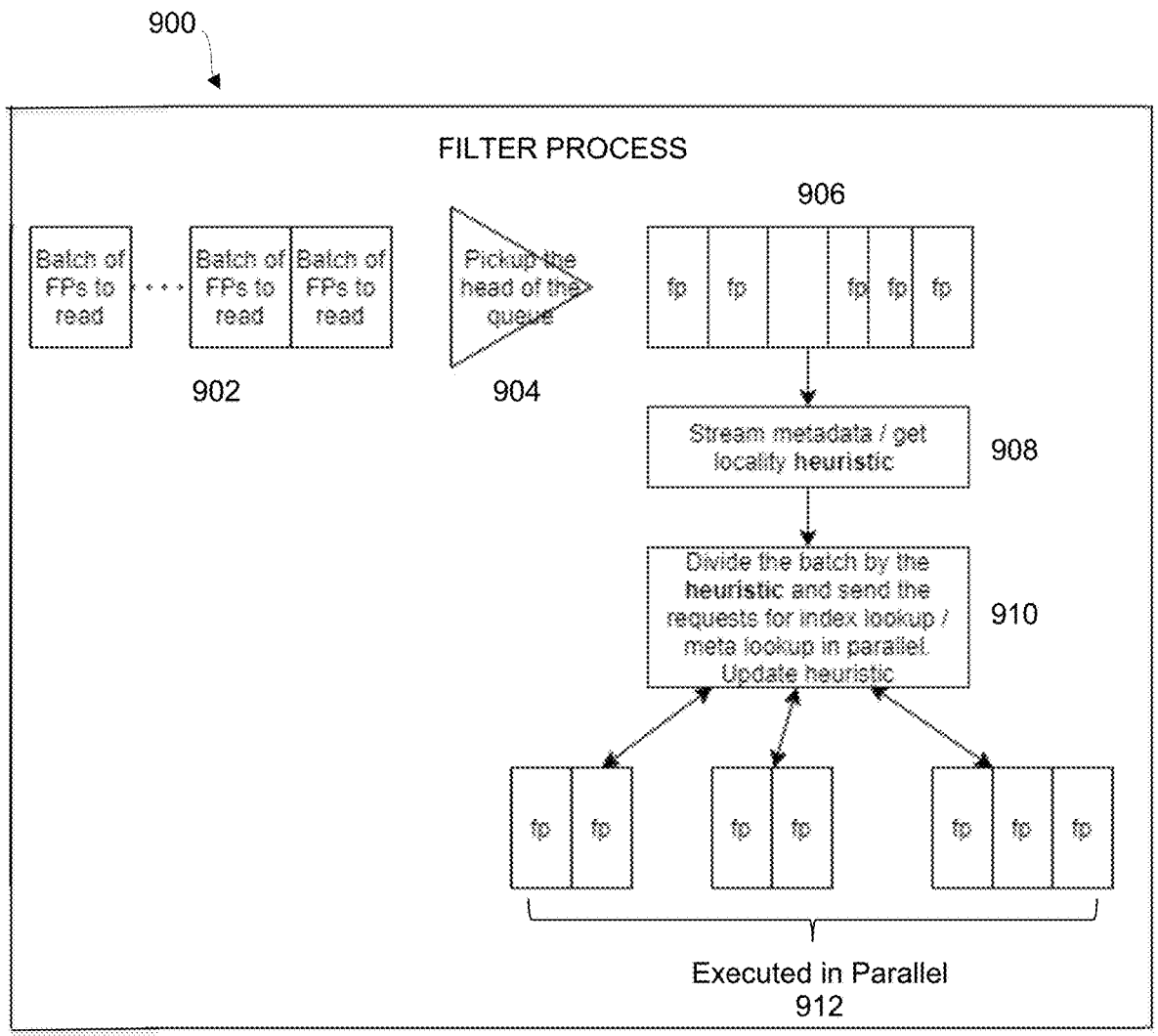
FIG. 9 illustrates a system restoring files using locality and fingerprint batch slicing, under some embodiments.

FIG. 9 illustrates a system restoring files using locality and fingerprint batch slicing, under some embodiments. FIG. 9 illustrates a filter process component 900 that slices large batches prefetched fingerprints into smaller batches if locality is determined to be less than optimal, as shown in process 600 of FIG. 6. When a file restore operation is started, the slicing mechanism is not employed right away. Instead, the locality of the fingerprints for the restore is first tracked over some number of prefetch batches 902. A queue processing component 904 picks up the head of the queue of each batch of the batches of fingerprints 902 to generate a first set of fingerprints 906 that are then streamed throughout the system. As shown in FIG. 9, in processing component 908, a locality heuristic is obtained to determine if subsequent prefetch batches should be sliced based on whether the locality is considered to be bad locality based on the system load or other operating characteristic. If the decision is made to slice the current batch, an optimal slice size for the slicing is determined based on the current locality, 910. The slicing process, such as shown in FIG. 8 is invoked dynamically and immediately to create sub-batches (slices) of fingerprints, 912, that are then processed in parallel by the prefetch mechanism 200, such as shown in FIG. 2.

In an embodiment, the locality calculation is continuously updated with each prefetch batch, so that the overall process heuristically adjusts to optimize the batch slicing in relation to system constraints and performance. If the locality gets worse, as indicated by locality tracker, then the optimal slice size is decreased accordingly, thus increasing the parallelism of prefetching as desired. Likewise, if the locality gets better, the slice size is increased, reducing the excess processing required for the slicing and parallel prefetching of the smaller sub-batches.

The system thus dynamically responds to changes in locality by adjusting the prefetching parallelism in response to real-time processing characteristics. Once invoked, the batch slicing process can be suspended if necessary. For example, if the locality metric improves relative to the bad locality threshold and/or the system load becomes excessively high, batch slicing can be dynamically suspended until the heuristic mechanism decides to resume it. Likewise, if locality is originally good, but deteriorates and/or if the system load is minimal and some degree of parallel processing can improve file restores, the slicing process can be tuned to create more sub-batches for each prefetch batch.

Embodiments of the processes and techniques described above can be implemented on any appropriate backup system operating environment or file system, or network server system. Such embodiments may include other or alternative data structures or definitions as needed or appropriate.

Figure 10:
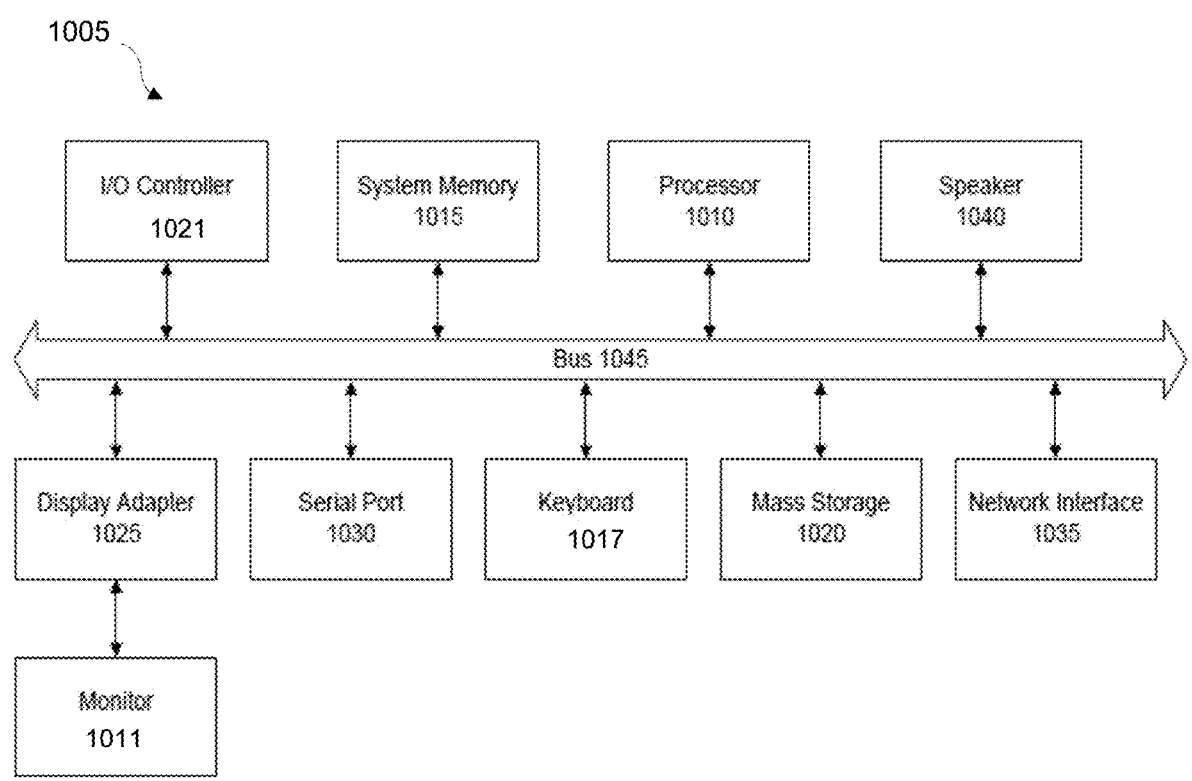
FIG. 10 is a system block diagram of a computer system used to execute one or more software components of the file locality-based prefetch process, under some embodiments.

The network of FIG. 1 may comprise any number of individual client-server networks coupled over the Internet or similar large-scale network or portion thereof. Each node in the network(s) comprises a computing device capable of executing software code to perform the processing steps described herein. FIG. 10 shows a system block diagram of a computer system used to execute one or more software components of the present system described herein. The computer system 1005 includes a monitor 1011, keyboard 1017, and mass storage devices 1020. Computer system 1005 further includes subsystems such as central processor 1010, system memory 1015, I/O controller 1021, display adapter 1025, serial or universal serial bus (USB) port 1030, network interface 1035, and speaker 1040. The system may also be used with computer systems with additional or fewer subsystems. For example, a computer system could include more than one processor 1010 (i.e., a multiprocessor system) or a system may include a cache memory.

Arrows such as 1045 represent the system bus architecture of computer system 1005. However, these arrows are illustrative of any interconnection scheme serving to link the subsystems. For example, speaker 1040 could be connected to the other subsystems through a port or have an internal direct connection to central processor 1010. The processor may include multiple processors or a multicore processor, which may permit parallel processing of information. Computer system 1005 is only one example of a computer system suitable for use with the present system. Other configurations of subsystems suitable for use with the present invention will be readily apparent to one of ordinary skill in the art.

Computer software products may be written in any of various suitable programming languages. The computer software product may be an independent application with data input and data display modules. Alternatively, the computer software products may be classes that may be instantiated as distributed objects. The computer software products may also be component software.

An operating system for the system 1005 may be one of the Microsoft Windows®. family of systems (e.g., Windows Server), Linux, Mac OS X, IRIX32, or IRIX64. Other operating systems may be used. Microsoft Windows is a trademark of Microsoft Corporation.

The computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, 802.11ac, and 802.11ad, among other examples), near field communication (NFC), radio-frequency identification (RFID), mobile or cellular wireless. For example, signals from a computer may be transferred, at least in part, wirelessly to components or other computers.

In an embodiment, with a web browser executing on a computer workstation system, a user accesses a system on the World Wide Web (WWW) through a network such as the Internet. The web browser is used to download web pages or other content in various formats including HTML, XML, text, PDF, and postscript, and may be used to upload information to other parts of the system. The web browser may use uniform resource identifiers (URLs) to identify resources on the web and hypertext transfer protocol (HTTP) in transferring files on the web.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor. More than one computer may be used, such as by using multiple computers in a parallel or load-sharing arrangement or distributing tasks across multiple computers such that, as a whole, they perform the functions of the components identified herein; i.e., they take the place of a single computer. Various functions described above may be performed by a single process or groups of processes, on a single computer or distributed over several computers. Processes may invoke other processes to handle certain tasks. A single storage device may be used, or several may be used to take the place of a single storage device.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

All references cited herein are intended to be incorporated by reference. While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A computer-implemented method comprising:
   tracking a locality of data segments in a data stream of files being restored in a storage system, wherein restoration requires issuing a read request within an input/output (I/O) request to a file system of the storage system;
   batching the data segments into a plurality of batches;
   determining, for each batch, a locality of a current prefetch operation by a number of distinct container identifiers (CIDs) accessed by the data segments in the batch;
   comparing the determined locality to a defined threshold value;
   dividing, if the determined locality is less than the threshold value, the batch into a first number of sub-batches;
   determining a load on the system based on at least one of: number of streams, number of background jobs, and I/O response time, wherein a numerically higher threshold value indicates closer locality among data elements based on a lower number of CIDs accessed, and a numerically lower threshold value indicates a higher degree of distribution of the data elements among a greater number of CIDs accessed;
   determining a number of smaller sub-batches dividing the batch based on a locality a first batch and the load; and
   performing a prefetch operation on each sub-batch in parallel with one another.

2. The method of claim 1 wherein if the determined locality is not less than the threshold value, the data segments of the batch are processed serially with respect to one another.

3. The method of claim 1 wherein the locality indicates the number of different containers to be accessed to fetch data for a particular offset range of the prefetch operation, and provides an indicator of increased input/output (I/O) operations that would occur if the storage system attempted to read the data.

4. The method of claim 1 wherein the second number of sub-batches is lower than the first number of sub-batches if the load is higher or if the locality of the next large batch is higher than the locality of the large batch, and further wherein the second number of sub-batches is higher than the first number of sub-batches if the load is lower or if the locality of the next large batch is lower than the locality of the large batch.

5. The method of claim 4 wherein a numerically higher threshold value indicates closer locality among data elements and a numerically lower threshold value indicates a higher degree of distribution of the data elements.

6. The method of claim 1 wherein the tracking step tracks a number of distinct CID accesses per batch in a histogram distribution.

7. The method of claim 1 wherein the tracking step tracks a history of locality using a sliding locality window.

8. The method of claim 1 wherein the prefetch moves data from a prefetched file into a read-ahead cache to be sent to a read request consumer of the file system, and wherein the prefetch comprises a hint that a read I/O is imminent for purposes of filling the read-ahead cache and preventing a need to issue a blocking I/O operation.

9. The method of claim 1 wherein the storage system comprises part of a deduplication backup process executed by a data storage server running a Data Domain file system (DDFS), and wherein the data stream comprises a Stream-Informed Segment Layout (SISL) formatted data stream.

10. A method of providing a dynamic prefetch process based on file locality in a deduplication system, comprising:
    tracking a locality of data elements in a batched data stream, wherein the locality per batch corresponds to a number of different container IDs (CIDs) accessed by the data elements;
    determining whether the locality within a batch exceeds a threshold separating acceptable versus non-acceptable distribution of data accesses by the data elements over a plurality of container IDs;
    processing the data elements in a serial prefetch process for a batch that does not exceed the threshold;
    dividing a batch into a plurality of smaller sub-batches for a batch that does exceed the threshold and executing the prefetch process in parallel for the sub-batches; and
    determining a load on the system based on at least one of: number of streams, number of background jobs, and I/O response time, wherein a numerically higher threshold value indicates closer locality among data elements based on a lower number of CIDs accessed, and a numerically lower threshold value indicates a higher degree of distribution of the data elements among a greater number of CIDs accessed, the method further comprising determining a number of smaller sub-batches dividing the batch based on a locality a first batch and the load.

11. The method of claim 10 further comprising:
    decreasing the number of smaller sub-batches for a second batch if at least one of the load is increased or the locality of the second batch is increased; and
    increasing the number of smaller sub-batches for the second batch if at least one of the load is decreased or the locality the second batches is decreased.

12. The method of claim 10 wherein the data elements comprise fingerprints of data segments that are used to filter data segments previously stored by the deduplication system to prevent redundant storage, the method further comprising:
    filtering out previously stored data segments;
    packing remaining data segments into a plurality of compression regions; and
    packing a plurality of compression regions into one or more containers; and defining metadata for each container that identifies all fingerprints contained in the container.

13. The method of claim 12 wherein the prefetch moves data from a prefetched file into a read-ahead cache to be sent to a read request consumer of the file system, and wherein the prefetch comprises a hint that a read I/O is imminent for purposes of filling the read-ahead cache and preventing a need to issue a blocking I/O operation.

14. The method of claim 13 wherein the storage system comprises part of a deduplication backup process executed by a data storage server running a Data Domain file system (DDFS), and wherein the data stream comprises a Stream-Informed Segment Layout (SISL) formatted data stream.

15. A method comprising:
batching a data stream into a plurality of batches, each having a number of data segments for prefetching by a prefetch operation;
determining a locality of a first batch of the data stream based on a number of different container IDs (CIDs) accessed by data segments in the batch;
determining a load on the system based on at least one of: number of streams, number of background jobs, and I/O response time;
determining a performance of the prefetch operation for the batch based on the load and the locality;
dividing the batch into a plurality of sub-batches if the locality is lower than a defined threshold; and
performing the prefetch operation in parallel for each of the sub-batches, wherein a numerically higher threshold value indicates closer locality among data elements based on a lower number of CIDs accessed, and a numerically lower threshold value indicates a higher degree of distribution of the data elements among a greater number of CIDs accessed, the method further comprising determining a number of smaller sub-batches dividing the batch based on a locality a first batch and the load.

16. The method of claim 15 further comprising:
monitoring the prefetch performance as the data stream is ingested; and
adjusting the plurality of sub-batches for subsequent batches of the data stream as the prefetch performance varies.

17. The method of claim 15 further comprising:
decreasing the number of the plurality of sub-batches for a subsequent batch if at least one of the load is increased or the locality of the subsequent batch is increased; and
increasing the number of the plurality of sub-batches for the subsequent batch if at least one of the load is decreased or the locality the subsequent batches is decreased.

* * * * *